United States Patent
Yamamoto et al.

(10) Patent No.: US 6,207,604 B1
(45) Date of Patent: Mar. 27, 2001

(54) β-ZEOLITE MOLECULAR SIEVE ABSORBENT

(75) Inventors: Azuma Yamamoto, Toyohashi; Akira Takahashi; Takuya Hiramatsu, both of Nagoya, all of (JP)

(73) Assignee: NGK Insulators, Ltd. (JP)

( * ) Notice: Subject to any disclaimer, the term of this patent is extended or adjusted under 35 U.S.C. 154(b) by 0 days.

(21) Appl. No.: 09/125,505
(22) PCT Filed: Jan. 6, 1998
(86) PCT No.: PCT/JP98/00004
§ 371 Date: Aug. 20, 1998
§ 102(e) Date: Aug. 20, 1998
(87) PCT Pub. No.: WO98/30325
PCT Pub. Date: Jul. 16, 1998

(30) Foreign Application Priority Data

Jan. 8, 1997 (JP) .................................................. 9-001237

(51) Int. Cl.$^7$ ...................................................... B01J 29/06
(52) U.S. Cl. .................... 502/64; 423/213.2; 423/239.2; 423/713
(58) Field of Search ................................ 423/213.2, 713, 423/239.2; 502/64, 71, 77

(56) References Cited

U.S. PATENT DOCUMENTS

| | | | |
|---|---|---|---|
| 3,308,069 | * 3/1967 | Wadlinger et al. | 252/455 |
| 4,208,305 | * 6/1980 | Kouwenhoven et al. | 252/431 N |
| 4,554,145 | * 11/1985 | Rubin | 423/328 |
| 4,568,655 | * 2/1986 | Oleck et al. | 502/66 |
| 4,585,799 | * 4/1986 | Morris et al. | 518/717 |
| 4,696,732 | * 9/1987 | Angevine et al. | 208/111 |
| 4,701,313 | * 10/1987 | Chang et al. | 423/277 |
| 4,827,068 | * 5/1989 | Chen et al. | 585/408 |
| 5,013,537 | * 5/1991 | Patarin et al. | 423/328 |

(List continued on next page.)

FOREIGN PATENT DOCUMENTS

| | | |
|---|---|---|
| 0 064 328 A1 | 11/1982 | (EP) . |
| 0 593 898 A1 | 4/1994 | (EP) . |
| 5-220403 | 8/1993 | (JP) . |
| 7-185326 | 7/1995 | (JP) . |
| 8-10613 | 1/1996 | (JP) . |
| 9-99207 | 4/1997 | (JP) . |

OTHER PUBLICATIONS

Kumar R. et al.: "Convenient Synthesis of Crystalline Microporous Transition Metal Silicates Using Complexing Agents" Studies in Surface Science and Catalysis, vol. 84; Jul. 17, 1994; pp. 109–116, XP000619621 *the whole document*.

Patent Abstracts of Japan; vol. 097, No. 001; Jan. 31, 1997 & JP 08 229386 A (Mazda Motor Corp); Sep. 10, 1996 *abstract*.

Patent Abstracts of Japan; vol. 097, No. 005; May 30, 1997 & JP 09 000884 A (Babcock Hitachi KK); Jan. 7, 1997 *abstract*.

Database WPI; Section Ch, Week 9619; Derwent Publications Ltd., London, GB; Class E36, An 96–182793 XP00209518 & JP 08 057262 (Babcock Hitachi KK); Mar. 5, 1996 *abstract*.

*Primary Examiner*—Tom Dunn
*Assistant Examiner*—Cam N. Nguyen

(57) ABSTRACT

The present invention provies an adsorbent which, as compared with an adsorbent comprising a zeolite (an aluminosilicate) of at least about equal Si/(Fe+Al) molar ratio (Fe is substantially absent), has high heat resistance and high hydrothermal resistance and can maintain adsorption capability even when exposed to high temperatures. This adsorbent comprises a β-silicate molecular sieve containing at least Fe besides H, O and Si and, when Al is contained, containing Fe in a molar amount at least equal to that of Al.

2 Claims, 1 Drawing Sheet

U.S. PATENT DOCUMENTS

| | | | |
|---|---|---|---|
| 5,077,026 | * 12/1991 | Nair et al. | 423/326 |
| 5,110,570 | * 5/1992 | Bellussi et al. | 423/277 |
| 5,290,533 | * 3/1994 | Bellussi et al. | 423/704 |
| 5,312,608 | * 5/1994 | Hayasaka et al. | 423/213.5 |
| 5,409,671 | * 4/1995 | Takemoto et al. | 422/180 |
| 5,417,947 | * 5/1995 | Hertl et al. | 423/212 |
| 5,518,976 | * 5/1996 | Itoh et al. | 502/66 |
| 5,538,697 | * 7/1996 | Abe et al. | 422/171 |
| 5,558,851 | * 9/1996 | Miller | 423/702 |
| 5,648,562 | * 7/1997 | Henrick | 568/774 |
| 5,676,912 | * 10/1997 | Sharma et al. | 423/213.2 |
| 5,677,254 | * 10/1997 | Nojima et al. | 502/65 |
| 5,753,121 | * 5/1998 | Geus et al. | 210/490 |
| 5,863,855 | * 1/1999 | Nojima et al. | 502/309 |
| 5,925,329 | * 7/1999 | Williams et al. | 423/700 |
| 6,051,205 | * 4/2000 | Yamamoto et al. | 423/700 |

* cited by examiner

β-ZEOLITE MOLECULAR SIEVE ABSORBENT

TECHNICAL FIELD

The present invention relates to an adsorbent suitably used for hydrocarbon adsorption and purification of the exhaust gas emitted from an automobile.

BACKGROUND ART

Catalysts used for purification of the exhaust gas emitted from automobiles, etc. must be heated to a desired temperature or higher by, for example, the heat of exhaust gas, in order to exhibit their catalytic activities. Therefore, when the temperature of exhaust gas is low as experienced during the cold start of engine, the harmful substances (HC, CO and NOx) in exhaust gas are hardly purified. HC, in particular, is discharged in a large amount during the cold start, and its purification is an important task to be achieved.

To improve the efficiency of HC purification during the cold start, a technique is known which comprises using, as a HC adsorbent, a molecular sieve made of a crystalline aluminosilicate (e.g. a zeolite) and allowing the adsorbent to adsorb and store HC until a catalyst reaches its operating temperature.

For example, an apparatus for purification of automobile exhaust gas, using Y zeolite or mordenite as a HC adsorbent is disclosed in Japanese Patent Application Kokai (Laid-Open) No. 75327/1990. Also in Japanese Patent Application Kokai (Laid-Open) No. 293519/1992 is asserted use of an adsorbent obtained by subjecting $H^+$/ZSM-5 zeolite to ion exchange with Cu and Pd, in order to alleviate the adverse effect by water adsorption and achieve higher HC adsorption capability and wider temperature range allowing for HC adsorption. For the same purpose, use, as an adsorbent, of a pentasil type metalosilicate subjected to ion exchange with H, Cu or Pd is proposed in Japanese Patent Application Kokai (Laid-Open) No. 63392/1994.

Zeolites, etc. heretofore used as a HC adsorbent, however, are inferior in heat resistance, particularly in heat resistance in a moisture-containing atmosphere (e.g. an automobile exhaust gas), i.e. hydrothermal resistance, as compared with alumina, etc. used as a carrier of ordinary catalyst for automobile exhaust gas purification; therefore, there has been a fear that they deteriorate when used at high exhaust gas temperatures such as experienced in continuous high speed driving of automobile.

Use of zeolite particularly in an in-line type exhaust gas purification system (which uses no bypass for high temperature exhaust gas and has a simple structure) has been fairly severe to ordinary zeolite.

The present invention has been completed in view of the above-mentioned problem of the prior art. The object of the present invention is to provide an adsorbent suitably usable in applications where the adsorbent must have high heat resistance and high hydrothermal resistance, for example, a HC adsorbent used in a system for hydrocarbon adsorption or for purification of exhaust gas from internal combustion engine, such as an in-line type system for exhaust gas purification.

DISCLOSURE OF THE INVENTION

According to the present invention, there is provided an adsorbent comprising a β-silicate molecular sieve, which silicate contains at least Fe besides H, O and Si and, when Al is contained, contains Fe in a molar amount at least equal to that of Al.

Preferably, the β-silicate molecular sieve has a Si/Al molar ratio of 80 or more.

The adsorbent of the present invention is suitably used for adsorption of hydrocarbons and for purification of automobile exhaust gas.

BEST MODE FOR CARRYING OUT THE INVENTION

Figure 1:
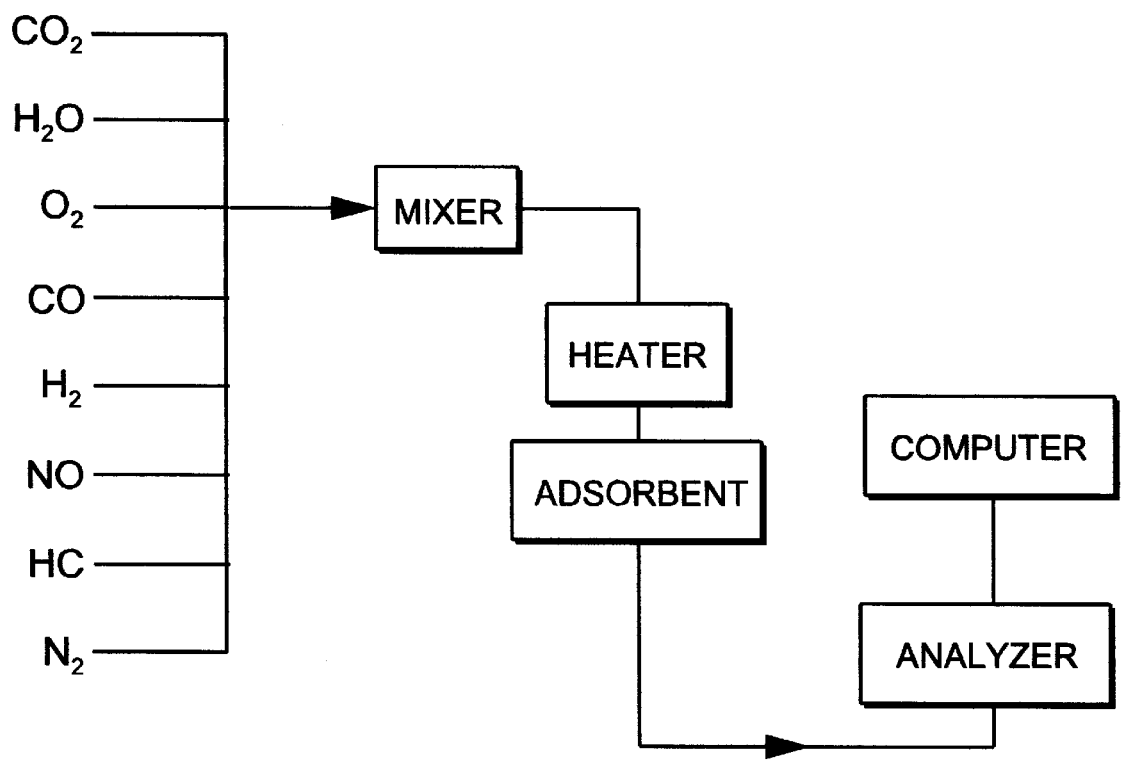
FIG. 1 is a drawing showing the constitution of the testing apparatus used for measurement of hydrocarbon adsorption capability.

The adsorbent of the present invention comprises a β-silicate molecular sieve which contains at least Fe besides H, O and Si and, when Al is contained, contains Fe in a molar amount at least equal to that of Al.

Comprising the above β-silicate molecular sieve, the present adsorbent, as compared with an adsorbent comprising a zeolite (an aluminosilicate) of at least about equal Si/(Fe+Al) molar ratio (Fe is substantially absent), has high heat resistance and high hydrothermal resistance and can maintain adsorption capability even when exposed to high temperatures.

Therefore, the present adsorbent can be used suitably as a HC adsorbent of a system for hydrocarbon adsorption and purification of exhaust gas from internal combustion engine, for example, an in-line type exhaust gas purification system.

When the adsorbent of the present invention is used for purification of exhaust gas from internal combustion engine, it is preferable that the β-silicate molecular sieve is used by being loaded on a carrier such as honeycomb structure or the like.

The β-silicate molecular sieve used in the present adsorbent has a β type zeolite structure and contains larger pores than pentasil type silicate; therefore, it can adsorb even hydrocarbons of large molecules and moreover has a larger adsorption capacity.

Generally in pores of one-dimensional structure (having no branching), when two places of one pore are plugged by coking, the portion of the pore between the two places does not contribute to adsorption. In the β-silicate molecular sieve used in the present adsorbent, however, the pore structure is two-dimensional or three-dimensional and significant reduction in adsorptivity can be prevented.

Zeolite refers to an inorganic crystalline molecular sieve having uniform pores, made of aluminosilicate (Al silicate), in particular. Part or the whole of the Al can be substituted by other particular element.

In the present invention, Fe is allowed to be present in a zeolite mainly by adding a Fe compound (or Fe simple substance) to raw materials and then conducting zeolite synthesis.

This method makes it possible to synthesize a β-silicate molecular sieve which is a zeolite of relatively uniform composition.

In the β-silicate molecular sieve used in the present adsorbent, not only Fe is contained but also a Si/Al molar ratio and a Si/Fe molar ratio have been specified based on the study made on the effect of these molar ratios on the hydrothermal resistance, etc. of the molecular sieve.

The effect becomes noticeable from around the contents at which the Si/Al molar ratio and the Si/Fe molar ratio become equal. In order to allow the β-silicate molecular sieve to have an hydrothermal resistance required for a HC adsorbent for purification of exhaust gas from internal combustion engine (such an adsorbent is the primary usage of the present invention), the β-silicate molecular sieve preferably has a Si/Al molar ratio of 80 or more and a Si/Fe molar ratio of 80 or less.

Since a lower Al content generally gives higher hydrothermal resistance, it is preferable that the Si/Al molar ratio is 80 or more and is as large as possible.

Below is described the merits and effects brought about by the presence of Fe in the β-silicate molecular sieve of the present adsorbent.

The Fe used in the present invention has a valency of 3 (same as Al) or 4 (same as Si) which is most stable at room temperature, in the form of oxide; has an ionic radius relatively close to that of Al; and can be easily substituted for Al.

Nevertheless, the Fe, as compared with Al, tends to be released from the crystal lattice of β-silicate molecular sieve.

However, the Fe, even when released, does not substantially promote destruction of zeolite structure, which is different from Al.

Rather, it is likely that the Fe released from the lattice remains in the particles, functions as an adhesive, and prevents the crystal structure from being destroyed.

Further, it is presumed that the Fe remaining in the particles makes a solid solution with the Al released from the lattice, prevents the movement of Al, and prevents the destruction of crystal structure.

As is clear from the above, the β-silicate molecular sieve used as the adsorbent of the present invention, as compared with conventional silicate molecular sieves, is improved in heat resistance and hydrothermal resistance of structure and adsorption capacity.

EXAMPLES

The present invention is described in detail below by way of Examples. However, the present invention is in no way restricted to these Examples.

Examples 1 to 3 and Comparative Examples 1 to 3

There were mixed desired amounts of fumed silica ($SiO_2$:>99.9 wt. %), NaOH, $Al(NO_3)_3 \cdot 9H_2O$, $Fe(NO_3)_3 \cdot 9H_2O$, NaCl, TEAOH [=$(C_2H_5)_4NOH$] and water, to prepare a raw material gel. The gel was placed in a fluororesin container, transferred into in an autoclave, heated therein to 135° C. in 1 hour under an autogenic pressure, kept at 135° C. for 144 hours, and allowed to cool to synthesize a β-(Fe,Al)silicate.

The silicate was subjected to water washing, drying, calcination, ion exchange, drying and calcination to obtain $H^+$/β-(Fe,Al)silicates of Examples 1 to 3 and Comparative Examples 1 to 2.

In Comparative Example 3 was used a $H^+$/type β-zeolite having a $SiO_2/Al_2O_3$ molar ratio of about 110, produced by THE PQ CORPORATION.

The chemical analysis results of the above silicates and zeolite are shown in Table 1.

TABLE 1

|  | Si/Fe molar ratio | Si/Al molar ratio | $Na_2O$ (wt. %) | Specific surface area ($m^2/g$) |
| --- | --- | --- | --- | --- |
| Example 1 | 17 | 97 | <0.01 | 575 |
| Example 2 | 16 | 135 | <0.01 | 580 |
| Example 3 | 18 | 83 | <0.01 | 573 |
| Comparative Example 1 | 19 | 55 | <0.01 | 571 |
| Comparative Example 2 | 18 | 76 | <0.01 | 574 |
| Comparative Example 3 | >2500 | 57 | 0.02 | 574 |

Comparison of Hydrocarbon Adsorption Capability Before and After Durability Test
(1) Production of Adsorbents for Durability Test To each of the powders of the above 6 kinds of zeolites of Examples 1 to 3 and Comparative Examples 1 to 3 were added water and an alumina sol having an alumina content of 2.5% by weight. Each mixture was pulverized in a ball mill for 20 hours to prepare 6 different slurries. In each slurry was dipped a mini honeycomb structure (diameter: 25.4 mm, length: 50.8 mm, apparent volume: about 26 cc) molded from a cordierite honeycomb structure produced by NGK Insulators, Ltd. (square cells, cell density: 400 cells/$in.^2$, rib thickness: 6 mil), followed by drying. This dipping and drying was repeated to conduct wash coating so that the amount of the slurry loaded became 0.16 g/cc. The resulting material was dried sufficiently and calcinated in air at 550° C. for 1 hour to produce adsorbents for durability test. The number of adsorbents produced was 3 for each zeolite, and one of the three was not subjected to any durability test and the remaining two were subjected to the following durability test. Then, the three adsorbents were measured for hydrocarbon adsorption capability.

(2) Durability Test Using Engine Exhaust Gas

The adsorbent produced above was disposed in the exhaust gas line of an internal combustion engine (an in-line four-cylinder type gasoline engine of 2.0 L displacement), and the engine was operated for 100 hours while the exhaust gas temperature at the inlet of the adsorbent was controlled to become 850° C. This test was conducted two times for each kind of adsorbent, that is, two adsorbents of each kind were used for the test.

(3) Measurement of Hydrocarbon Adsorption Capability

The hydrocarbon adsorption capability of each adsorbent before and after the above durability test were measured as follows. A testing apparatus shown in FIG. 1 was used. A gas simulating the exhaust gas emitted from an internal combustion engine during the cold start, which consisted of 16 volume % of $CO_2$, 10 volume % of $H_2O$, 0.77 volume % of $O_2$, 2 volume % of CO, 0.33 volume % of $H_2$, 2,000 ppm (by volume) of NO, 5,000 ppm (by volume) of hydrocarbons (toluene) (this value is obtained by multiplying the carbon number of the hydrocarbon by the volume of the hydrocarbon) and the remainder of $N_2$, was passed through an adsorbent to measure hydrocarbon adsorption capability at a rate of 17 NL/min; the amount of hydrocarbons in the gas after having been passed through the adsorbent was measured for 150 seconds from the start of gas passing; thereby, the adsorption efficiency (%) of the adsorbent was determined. The gas temperature at the inlet of adsorbent was controlled at 60° C., 100° C., 140° C. or 180° C.

The adsorption efficiency (%) was calculated from the following equation. The results obtained are shown in Table 2.

Adsorption efficiency (%)=[(B−A)/B]×100 wherein
A: the amount of hydrocarbons measured using an adsorbent formed by loading a zeolite on a honeycomb structure, and
B: the amount of hydrocarbons measured using a honeycomb structure loading no zeolite thereon.

TABLE 2

| | Durability test | Adsorption efficiency (%) at adsorbent inlet gas temperature of: | | | |
|---|---|---|---|---|---|
| | | 60° C. | 100° C. | 140° C. | 180° C. |
| Example 1 | Before | 96 | 93 | 60 | 30 |
| | After | 91 | 71 | 20 | 6 |
| Example 2 | Before | 95 | 94 | 64 | 33 |
| | After | 91 | 75 | 30 | 10 |
| Example 3 | Before | 93 | 90 | 53 | 24 |
| | After | 91 | 68 | 19 | 6 |
| Comparative Example 1 | Before | 93 | 88 | 52 | 23 |
| | After | 86 | 60 | 22 | 7 |
| Comparative Example 2 | Before | 94 | 92 | 54 | 25 |
| | After | 88 | 62 | 18 | 5 |
| Comparative Example 3 | Before | 92 | 82 | 46 | 18 |
| | After | 85 | 59 | 20 | 6 |

INDUSTRIAL APPLICABILITY

As described above, the adsorbent of the present invention, as compared with an adsorbent comprising a zeolite (an aluminosilicate) of at least about equal Si/(Fe+Al) molar ratio (Fe is substantially absent), has high heat resistance and high hydrothermal resistance and can maintain adsorption capability even when exposed to high temperatures.

Therefore, the present adsorbent is suitable as a hydrocarbon adsorbent used in a system for hydrocarbon adsorption or for purification of exhaust gas from internal combustion engine, for example, an in-line type system for exhaust gas purification.

What is claimed is:

1. An adsorbent comprising a β-zeolite molecular sieve, which β-zeolite consists essentially of Fe, H, O, Si, and Al with the Fe in a molar amount at least equal to that of Al and the molar ratio of Si/Al being 80 or more.

2. An automotive exhaust gas purification system having therein the adsorbent of claim 1.

* * * * *